Dec. 30, 1952  A. H. RODECK ET AL  2,623,504
FLUID PRESSURE COMPENSATING MEANS FOR HYDRAULIC GOVERNORS
Filed Sept. 10, 1948  2 SHEETS—SHEET 2
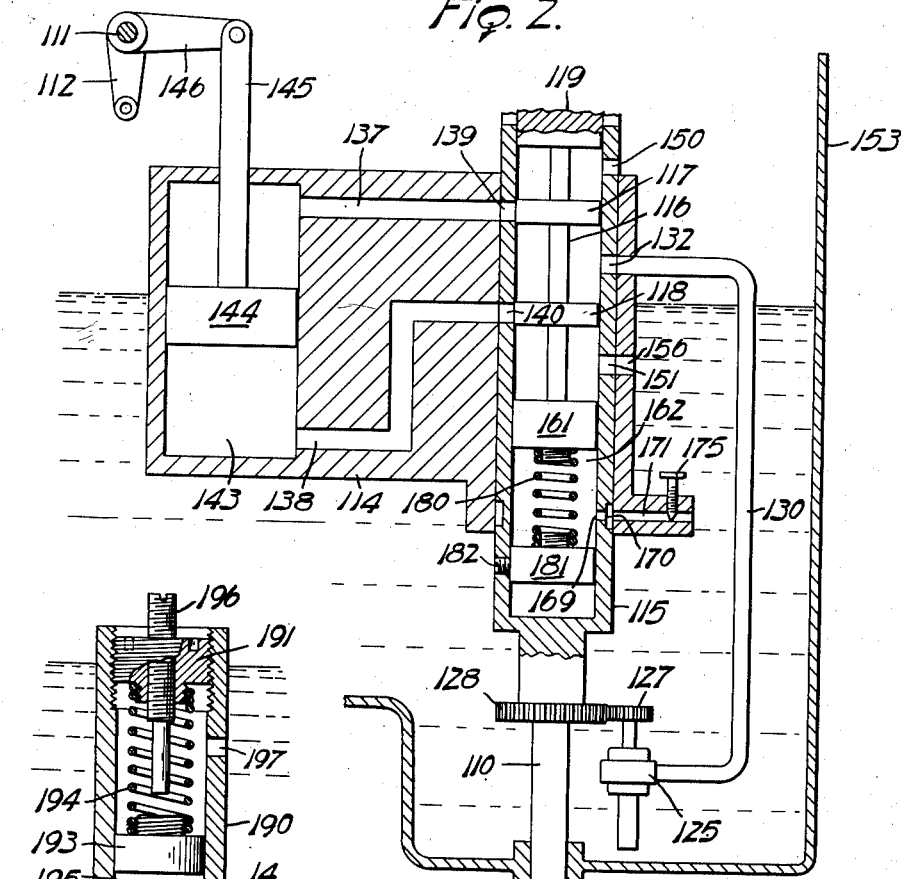
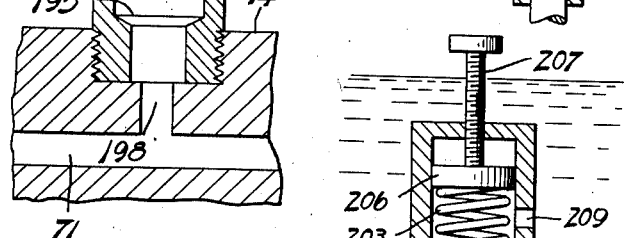
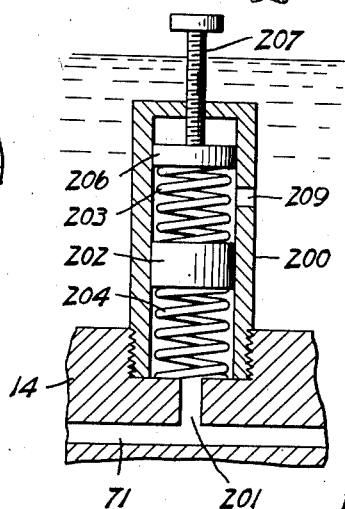
INVENTORS
Armin H. Rodeck and
Albert G. Massey
BY Bean, Brooks, Buckley & Bean.
ATTORNEYS Patented Dec. 30, 1952

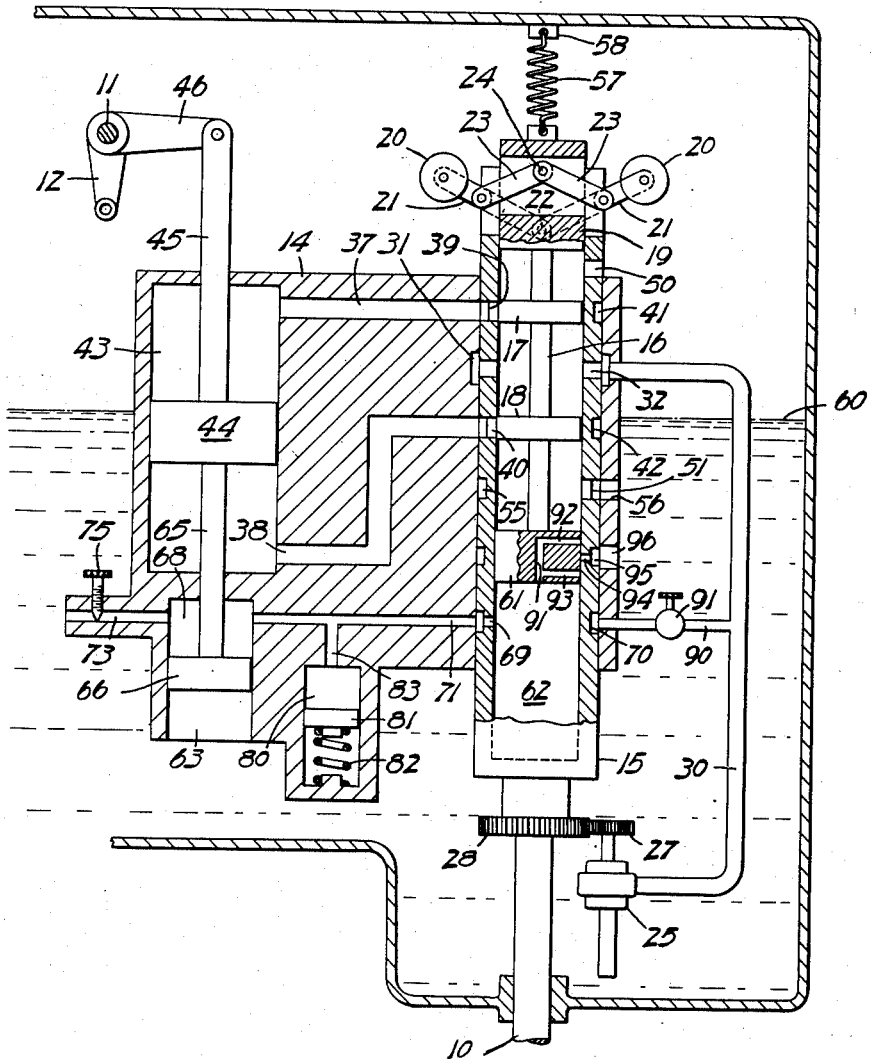

2,623,504

UNITED STATES PATENT OFFICE 2,623,504

FLUID PRESSURE COMPENSATING MEANS FOR HYDRAULIC GOVERNORS

Armin H. Rodeck and Albert G. Massey, Watertown, N. Y., assignors to Massey Machine Company, Watertown, N. Y.

Application September 10, 1948, Serial No. 48,733

1 Claim. (Cl. 121—43)

This invention relates to hydraulic governors for speed control and similar adaptations.

The principles of the present invention are applicable to direct-acting hydraulic governors of the general class shown in our prior co-pending applications Serial No. 719,682, filed January 2, 1947, now Patent No. 2,516,523, dated July 25, 1950, and Serial No. 46,098, filed August 25, 1948. In the aforesaid applications, the governors are rendered self-compensating by providing that the application of corrective fluid pressure to the power piston is pulsating or intermittent, so that during governor adjustment the movement of the power piston is by small steps or increments to avoid overshooting. The principles of the present invention provide essentially another compensating system whereby the pulsating pressure method may be eliminated; but in its broadest aspect, the present invention also comprises an improvement in the operation of the pulsating fluid pressure method of compensation.

In one form of the present invention, a fluid pressure chamber is established which is compressed or expanded directly by operation of the pilot valve, and a compensating cylinder in constant communication therewith has a compensating piston directly connected with the power piston for movement therewith. The compensating system thus established comprises normally a closed fluid system save only for a leakage needle valve or similar adjustably reduced orifice which acts as a dashpot regulator directly upon the pilot valve in resistance to initial movement thereof.

Secondly, the needle valve acts as a bypass to proportion the rate of time at which compensating fluid will act to close the pilot valve and thus proportions the degree of corrective movement of the power piston upon displacement of the pilot valve. Thirdly, the needle valve times the speed with which the pilot valve moves back to neutral in proportion to the speed of response of the engine so that the pilot valve will not move to open in the opposite direction under the pressure developed by the compensating piston.

In one aspect the principles of the present invention are applicable to the pulsating fluid compensating system and in this case the fluid chamber which is directly compressed and expanded by movement of the pilot valve has direct connection only with the needle valve controlled orifice, so that it comprises a dashpot cooperating directly with the pilot valve upon movement thereof from normal neutral position.

The present invention further provides means acting in cooperation with the pilot valve fluid chamber and the compensating fluid chamber to provide surge chambers both to serve as pressure accumulators and to serve as proportioning devices to determine the degree of initial corrective movement to be made by the power piston in response to pilot valve displacement. The accumulator and proportioning surge chambers may be used in combination or either one separately in conjunction with the aforesaid compensating system, and in modified form the same chamber may be employed to serve both purposes.

The present invention further provides means which nullify the compensating system upon extreme speed changes, so that a stronger compensating system may be employed to compensate for speed changes less than the established extremes.

Various other aspects of novelty are referred to and pointed out in detail in the following detailed specification, taken in conjunction with the accompanying drawings. It is to be understood that the principles of the present invention are not limited to the precise forms set forth by way of example, but only as defined in the appended claim.

In the drawings:

Fig. 1 is a general schematic view of one form of the governor of the present invention;

Fig. 2 is a general schematic view of a modified form of the governor of the present invention;

Fig. 3 is a fragmentary cross-sectional view showing a proportioning surge chamber for use with the compensating system of the governor of Fig. 1; and Fig. 4 is a view similar to Fig. 3, but showing a modified proportioning surge chamber.

In the form of governor illustrated in Fig. 1, the numeral 10 designates a shaft which is connectible with the engine or other device or system to be governed. The purpose and effect of the governor system is to maintain a constant velocity of shaft 10 despite changes in load, in the case of an engine, or of other conditions tending to vary the velocity of shaft 10. In the alternative, the governor serves to maintain a constant degree of speed droop, that is, a predetermined lessening of velocity with increases in load. The several forms of governor illustrated herein may be provided with speed droop adjusting means such as are shown in our prior co-pending application Serial No. 46,098 identified above.

Adjustment of the engine or other device or system being governed is accomplished by rotating or oscillating a shaft designated 11 in Fig. 1, and in the case of an engine shaft 11 may be connected with the throttle valve or other fuel control means, as by means of an arm 12. In the case of engine governing operation the load on the engine is reflected in the angular setting of shaft 11.

The flyweight head and the hydraulic fluid system which cooperates therewith operates in a housing 14 and comprises a shaft or sleeve 15 which rotates in a suitable bore in housing 14 and, in the present instance, is fixed directly to shaft 10 and may comprise an extension thereof, the shaft 10 being driven by the engine being governed.

Shaft 15 is bored to receive a pilot valve 16 which has axially spaced generally cylindrical valve heads 17 and 18 and is formed at its upper end with an enlargement 19 which cooperates to support a plurality of flyweights 20. The flyweights 20 are carried by arms 21 which have a common pivot 22 at the outside of shaft 15. The arms 21 are pivotally engaged by links 23 which are also pivotally connected to the enlargement 19 of pilot valve 16 as at 24.

From the foregoing it will be clear that any tendency of centrifugal force to move the flyweights outwardly, upon increase in speed of the shafts 10 and 15, tends to straighten the toggles which the arms 21 and the links 23 form, and this results in lowering movement of pilot valve 16 in the bore of the shaft 15. A decrease in speed, evidenced by a tendency of the flyweights to move inwardly toward the shaft 15, tends to collapse the toggles, and the links 23 accordingly raise the pilot valve 16 in the shaft 15. The pilot valve 16 rotates with shaft 15 but is free to move axially therein.

The necessary hydraulic pressure required for operation of the governor is provided by a pump indicated at 25, which may be arranged to be driven from shaft 10 by a pair of gears 27 and 28. The pump 25 is preferably of the reversible type wherein the output is uni-directional regardless of the direction of rotation of the pump drive means. The outlet side of pump 25 communicates, by means of a conduit 30, with an annular passage 31 formed in support 14 and extending about shaft 15, the latter having a series of peripheral openings 32 in shaft 15, whereby conduit 30 has continuous and uninterrupted communication with the space between valve heads 17 and 18.

The housing 14 has a pair of passages 37 and 38, and shaft 15 is provided with peripheral openings 39 and 40 which are normally axially in registry with the valve heads 17 and 18 and also register axially with the passages 37 and 38 of housing 14, as illustrated in Fig. 1. The exterior periphery of shaft 15 at openings 39 and 40 is grooved as at 41 and 42 so as to maintain continuous communication between passages 39 and 40 and passages 37 and 38, respectively, during rotation of shaft 15.

Passages 37 and 38 communicate, respectively, with the upper and lower sides of a cylindrical chamber 43 formed in housing 14. A power or actuating piston 44 is disposed in chamber 43 and has a piston rod 45 which connects with an arm 46 fixed to shaft 11. In this way axial movement of piston 44 in chamber 43 produces rotative movement of shaft 11 and thus the movements of piston 44 in cylinder 43 directly determine and reflect the load setting of shaft 11, or any other variable condition which shaft 11 may serve to adjust.

Shaft 15 is formed with a peripheral outlet passage 50 above upper valve head 17 and a second peripheral outlet passage 51 below valve head 18. The upper outlet passage 50 is in continuous communication with the general interior of a casing 53 in which the governor is enclosed, and the lower outlet passage 51 is provided with a peripheral groove 55 formed in shaft 15 so that outlet opening 51 has continuous communication with an outlet passage 56 formed in housing 14.

At its upper end enlargement 19 of pilot valve 16 connects with the lower end of an extension coil spring 57 whose upper end is shown connected to the interior of housing 53 by means of an anti-friction bearing swivel 58. This connection is shown merely for simplicity of illustration and, while the governor is operative as shown, springs 57 will in general be anchored in such manner so as to provide means for adjusting its tension and may, in fact, be provided with the speed setting and speed droop adjustment arrangement shown in conjunction with the speeder spring of our co-pending application Serial No. 46,098, identified above.

In a general way, it will be seen from the foregoing that acceleration of shaft 10, by reason of increased centrifugal force on flyweights 20, will lower pilot valve 16 and, by lowering of valve head 18, connect pressure supply conduit 30 with conduit 38. This directs fluid pressure against the lower side of piston 44 and accordingly rotates shaft 11 in a counterclockwise direction to decrease the fuel setting, in instances where an engine is being governed, to accomplish the necessary slowing of shaft 10 to its desired speed level.

At the same time that conduit 38 is connected with fluid presure supply conduit 30, conduit 37 is connected with outlet passage 50 by reason of the lowering of valve head 17. The casing 53 which houses the governor mechanism itself comprises a reservoir or sump for pump 25 and all of the discharge outlets of the system discharge into the interior of casing 53 where they gravitate to the sump for reuse by the pump. In the form of governor illustrated in Fig. 1 the level of oil in the casing 53 is maintained substantially at or above the level indicated at 60 for purposes which will appear later herein.

The pilot valve 16 is further formed at its lower end with a piston head 61 which cooperates with the lower portion of the bore of shaft 15 to form a fluid pressure chamber 62. Housing 14 is formed with a hollow cylindrical formation 63 open at one end and disposed coaxially with power piston chamber 43. The power piston 44 has a tail rod 65 to which is fixed a compensating piston 66 which cooperates with cylindrical formation 63 to form a compensating cylinder chamber 68.

Shaft 15 is formed with a passage 69 leading from fluid pressure chamber 62 and has a peripheral groove 70 which places passage 69 in continuous fluid communication with a passage 71 in housing 14 which leads to compensating cylinder chamber 68. A second passage 73 formed in housing 14 leads from compensating cylinder 68 and comprises an outlet orifice adjustably restricted by means of a screw threaded needle valve 75.

With so much of the system of Fig. 1 as has thus far been described pilot piston chamber 62 and compensating cylinder 68 are in free and continuous communication and their only external communication is by way of passage 73, under the restrictive control of needle valve 75. It is to be noted that the outer end of passage 73 is continuously submerged in the hydraulic medium 60 in casing 73.

As thus arranged the pilot piston chamber 62 and compensating cylinder 68 act as compensating means particularly adaptable to slow speed engines with heavy flywheels and proportionately slow response. The degree of response of the governor to a change in engine speed can be reduced to any desired speed of correction by adjustment of needle valve 75.

If the load on the engine being governed is reduced, its speed tends to increase and the consequent outward urge of flyweights 20 moves pilot valve 16 downward. This movement is resisted by the fluid under piston head 61 in chamber 62, its only mode of egress being past the restricted orifice in passage 73 formed by needle valve 75. In addition to this fluid resistance, downward movement of the pilot valve connects pressure from conduit 30 to the under side of power piston 44, causing upward movement of compensating piston 66 and consequent forced fluid flow from compensating cylinder 68.

Again because of the restriction interposed by needle valve 75, this movement tends to force fluid into chamber 62 and thus moves the pilot valve upward until movement of power piston 44 stops. The needle valve thus acts as a restrictive by-pass, and, depending upon its adjustment, the power piston 44 will move a degree sufficient to return the pilot valve 16 to neutral position.

At this point in the operation movement of the power piston and pilot valve are stopped but the engine, while approaching its initial speed because of the amount of adjustment imparted to rock shaft 11 by movement of power piston 44, has not gone down to initial speed. During this period the pilot valve is pushing down on the compensating fluid in chamber 62 with a force corresponding to the amount that the engine is off speed, and this force causes leakage past the needle valve while the engine is coming back to speed, the speed of such leakage being sufficient to prevent the pilot valve from moving away from neutral in the opposite direction.

If the throttle adjustment effected by the power piston 44 in the foregoing manner proves insufficient, the pilot valve again moves downwardly to further adjust the power piston, such further adjustment being of lesser degree than the first because the engine has partially returned to proper speed and the relative unbalance of the flyweight force is correspondingly less.

Upon an increase in load on the engine, a reverse governor operation takes place. The pilot valve 16 rises and power piston 44 moves downwardly. This tends to enlarge both the chamber 62 beneath pilot valve 16 and the compensating cylinder 68. Thus, flow of fluid in passage 73 is from outside of housing 14 into the compensating cylinder 68, the outlet end of passage 73 being submerged in hydraulic medium as heretofore described. The operation is otherwise the same in theory as upon reduction in load on the engine.

It will be noted from a study of the foregoing that the restricted orifice controlled by needle valve 75 serves a three-fold function. First, it acts as a dashpot to regulate the initial pilot valve movement upon a deviation in speed of the engine being governed. Second, it serves as a by-pass to regulate the time period which will elapse before compensating fluid from compensating cylinder 68 will raise the pilot valve 16 to neutral position and thus proportions the degree of governing movement of the power piston. Third, it serves as a time delay means during the period when the pilot valve is in neutral and motionless while the engine is responding to the completed adjustment of the power piston 44, preventing the pilot valve from opening in the opposite direction.

It will be noted that with the foregoing compensating arrangement no other or extraneous compensating provision need be made, such as the continuously interrupted flow of fluid from the pilot valve shown and described in our two prior applications identified above. In the form of the present invention illustrated in Fig. 1, grooves 41 and 42 in shaft 15 provide for continuous and uninterrupted flow between pressure supply conduit 30 and either of the passages 37 or 38 when the pilot valve 16 is displaced in one direction or another.

The system of Fig. 1 thus far described is complete and operative, and the additional appurtenances now to be described constitute, in effect, additional modifications of the principles of the present invention. Referring to Fig. 1, the numeral 80 designates a cylindrical surge chamber which serves as an accumulator. A piston 81 is provided in chamber 80 and a relatively stiff compression-extension coil spring 82 is fixedly secured at its opposite ends to piston 81 and to the bottom of chamber 80. The accumulator chamber above piston 81 connects with passage 71 as at 83.

The push-pull action of spring 82 causes chamber 80 to serve as an accumulator in either direction, positively or negatively, from the neutral position where spring 82 is unstressed. This accumulator will be employed with engines that respond more quickly than those previously considered herein. In the case of modern higher speed engines having quick response to throttle changes there is less tendency for the governor to operate too fast and cause hunting.

The presence of the accumulator in such applications imparts greater flexibility of operation and the more yieldable nature of the forces imposed on the pilot valve by the compensating system gives the pilot valve more flexibility in producing control changes in the position of the power piston.

A further modification of the basic disclosure of Fig. 1 comprises a pressure conduit 90 from pressure supply conduit 30 to housing 14 where it communicates with groove 70 and accordingly with the interior of chamber 62. This maintains a positive hydrodynamic fluid pressure force under pilot valve 16 in partial counterbalance to the flyweight force, and there is a continuous flow outwardly past needle valve 75.

The degree of pressure normally maintained beneath pilot valve 16 in this manner may be manually adjusted by means of a valve 91. Thus, the movement of the compensating piston in this form modifies the pressure normally present under the pilot valve, either by increasing or reducing the same, during a governing step. Pressure conduit 90 may be used either with or without the accumulator arrangement 80 through 83.

It will be noted that piston head 61 of pilot valve 16 has a fluid passage 91 leading upwardly from chamber 62 and terminating in a pair of vertically spaced horizontal passages 92 and 93 which emerge from the periphery of piston head 61. A passage 94 in shaft 15 normally lies between passages 92 and 93 and an external annular groove 95 in shaft 15 places passage 94 in continuous communication with an outlet passage 96 in housing 14.

Passages 91 through 96 are normally inoperative, even during normal governor correcting operations, since the normal displacements of pilot valve 16 are not of sufficient degree to move either passage 92 or 93 into communication with passage 94. However, upon extreme movement of the flyweights in either direction the upper passage 92 or the lower passage 93 of piston head 61 connects with passage 94 and the compensation system including chamber 62 and compensating cylinder 68 may drain therethrough and thus there is no compensating action in the case of extreme speed changes and the governor exerts a very rapid corrective action. As soon as speed is corrected sufficiently to move the pilot valve from either of its extreme positions, the drain connection is again broken and compensation again takes place.

With the above provision for temporarily nullifying the compensating system the compensation can be very strong for stability in normal regulation. With an engine which is slow in response or where the drive to the governor is rough and uneven the governor must be held in restraint with a strong compensating system during normal regulating operation to prevent jiggle or hunting during correction.

In the form of governor illustrated in Fig. 2, means are provided merely for establishing a dashpot action for the pilot valve in a governor of the kind shown in our two co-pending applications mentioned above, in which compensation is attained by providing an intermittent or pulsating application of governing fluid pressure, so that the power piston approaches a new position by a series of step-by-step increments of movement and is thus self-compensating.

In Fig. 2, the numeral 110 designates a shaft which is connectible with the engine or other device or system to be governed. A shaft designated 111 may be connected with the throttle valve or other fuel control means, as by means of an arm 112.

The flyweight head and the hydraulic fluid system which cooperates therewith operates in a housing 114 and comprises a shaft or sleeve 115 which rotates in a suitable bore in housing 114 and is fixed directly to shaft 110 which is driven by the engine being governed.

Shaft 115 is bored to receive a pilot valve 116 which has axially spaced valve heads 117 and 118 and is formed at its upper end with an enlargement 119. The flyweight and speeder spring structure above enlargement 119 may be the same as in Fig. 1 or may be the same as illustrated in our prior application Serial No. 46,098 and is omitted in Fig. 2 in the interests of simplicity.

As in the previous embodiment, any tendency of centrifugal force to move the flyweights outwardly, upon increase in speed of the shafts 110 and 115, results in lowering movement of pilot valve 116 in the bore of shaft 115. A decrease in speed, evidenced by a tendency of the flyweights to move inwardly toward the shaft 15, tends to raise the pilot valve 116 in shaft 115. The pilot valve 116 rotates with shaft 115 but is free to move axially therein.

A pressure supply pump is indicated at 125 and is driven from shaft 110 by a pair of gears 127 and 128. The outlet side of pump 125 communicates, by means of a conduit 130, with a peripheral opening 132 in shaft 115, whereby conduit 130 has intermittent or pulsating communication with the space between valve heads 117 and 118 by reason of the rotation of shaft 115. The housing 114 has a pair of passages 137 and 138, and shaft 115 is provided with peripheral openings 139 and 140 which are normally axially in registry with the valve heads 117 and 118 and also register axially with the passages 137 and 138 of housing 114, as illustrated in Fig. 2.

Passages 137 and 138 communicate, respectively, with the upper and lower sides of a cylindrical chamber 143 formed in housing 114. A power or actuating piston 144 is disposed in chamber 143 and has a piston rod 145 which connects with an arm 146 fixed to shaft 111. In this way axial movement of piston 144 in chamber 143 produces rotative movement of shaft 111 and thus the movement of piston 144 in cylinder 143 directly determine and reflect the load setting of shaft 111, or any other variable condition which shaft 111 may serve to adjust.

Shaft 115 is formed with a peripheral outlet passage 150 above upper valve head 117 and a second peripheral outlet passage 151 below valve head 118. The upper outlet passage 150 is in continuous communication with the general interior of a casing 153 in which the governor is enclosed, and the lower outlet passage 151 has intermittent or pulsating communication with an outlet passage 155 formed in housing 114.

The general cooperation of pilot valve 116, passages 137 and 138 and power piston 144 are the same as previously described in the case of Fig. 1, excepting that the pulsating application of fluid pressure to power piston 144, due to the rotation of shaft 115, renders the governor self-compensating in substantially the manner set forth in application Serial No. 46,098. The casing 153 which houses the governor mechanism itself comprises a reservoir or sump for pump 125 and all of the discharge outlets of the system discharge into the interior of casing 153 where they gravitate to the sump for reuse by the pump. In the form of governor illustrated in Fig. 2, the level of oil in the casing 153 is maintained substantially at or about the level indicated at 160 for purposes which will appear later herein.

The pilot valve 116 is further formed at its lower end with a piston head 161 which cooperates with the bore of shaft 115 to form a fluid pressure chamber 162. Shaft 115 is formed with a passage 169 leading from fluid pressure chamber 162 and has a peripheral groove 170 which places passage 169 in continuous fluid communication with a passage 171 in housing 114 which comprises an outlet passage adjustably restricted by means of a screw threaded needle valve 175 or similar restrictive means for providing an adjustable leakage orifice.

Referring to the fluid chamber 162, the numeral 180 designates a coil spring whose upper end is fixed to the under side of piston 161 and whose lower end is fixed to a block 181, the latter being fixed relative to shaft 15 by means of a set screw 182. Spring 180 is an extension-compression spring and in the position illustrated in Fig. 2 is unstressed. It serves to continuously urge pilot valve 16 to its neutral position whenever the pilot valve is displaced from the passage blocking position illustrated in Fig. 2. Spring 180 damps out oscillations of the pilot valve due to any irregularity in the governor drive and also insures the return of the pilot valve to its normal neural position as the engine returns to speed after a governing correction.

Passage 171 and needle valve 175 thus provide an adjustable dashpot action which yieldably resists movement of the pilot valve in either direction with the push-pull spring augmenting the dashpot action in movements away from neutral and working against the dashpot action in movements toward the neutral position.

Figs. 3 and 4 show alternative forms of proportioning surge chambers for use in combination with the governor of Fig. 1. Their construction is such that, upon displacement of the pilot valve due to a speed change, they permit a quick action of the power piston for a definitely limited and adjustable distance, whereupon strongly compensated governor action follows for the remainder of the governor cycle. With engines having slow response this has the effect of providing a quick fuel adjustment change and then a time lag which permits the engine to respond fully to the change in throttle setting.

Either of the surge chambers of Figs. 3 and 4 may be inserted in passage 71 which connects pivot valve chamber 62 with compensating cylinder 68, and they may be used in conjunction with and in addition to the accumulator surge chamber 80, or they may be used without the accumulator surge chamber. The proportioning surge chambers of Figs. 3 and 4 primarily contemplate the employment of relatively light, weak springs but in certain alternative applications their springs may be made stronger and heavier and thus serve also as the accumulator, thereby replacing chamber 80 in passage 71.

Referring to Fig. 3, housing 14 is indicated fragmentarily as is passage 71 between chambers 62 and 68. The numeral 190 designates a hollow cylinder which may be threaded into housing 14 at one end and is internally threaded at its other end to receive a screw plug 191. A piston 193 is disposed in cylinder 190, and the upper side of piston 193 and the lower side of plug 191 may have threaded extensions for securely receiving the opposite ends of a coil spring 194. In the rest or neutral position illustrated in Fig. 3 spring 194 is unstressed but movement of piston 193 in either direction in cylinder 190 either compresses or extends spring 194, the latter thus serving as a yieldable push-pull element tending to urge piston 194 to an intermediate neutral position.

In the primary form being described, spring 194 is relatively light and movement of piston 193 thereagainst is relatively free. Readily adjustable means are accordingly provided for definitely limiting the range of action of piston 193 to bring the regular compensating system into play after a preliminary throttle adjustment is effected according to the adjusted limiting means acting on piston 193. The downward limit of movement is marked by the reduction in diameter of the bore in cylinder 190 which begins at the point designated 195 in Fig. 3.

A stop screw 196 is threaded centrally through plug 191 and its lower end engages the upper end of piston 193 to determine the upper limit of movement of the latter. Cylinder 190 is vented above piston 193 as at 197 to avoid any dashpot action above piston 193 and a passage 198 connects the lower end of cylinder 190 with passage 71. Plug 191 has spanner openings or other means to facilitate adjusting it axially in cylinder 190 and by proper screw adjustment of the positions of both plug 191 and stop screw 196 the total distance between lower limit 195 and the lower end of stop screw 196 may be determined, with piston 193 usually, but not necessarily, disposed midway therebetween when the governor is neutral. It is believed that the operation of the proportioning surge chamber of Fig. 3 is obvious from the preliminary remarks above.

Fig. 4 shows an alternative form of proportioning surge chamber comprising a cylinder 200 threaded into housing 14 at one of its ends and in communication with passage 71 by means of a connecting passage 201. A piston 202 in cylinder 200 has compression coil springs 203 and 204 at its opposite faces, the lower spring 204 seating against housing 14 at the inner end of cylinder 200 and the upper spring 203 seating against a floating block 206. An abutment screw 207 is threaded into the top of cylinder 200 and its inner end bears against block 206.

Piston 202 will automatically assume a neutral position midway between the lower face of block 206 and the surface of housing 14 against which spring 204 seats, the springs 203 and 204 being substantially identical and distributing the stress imposed by block 206 equally between them. Adjustment of screw 207 permits adjustment in the initial tension of both springs and the degree of movement of piston 202 from neutral upon displacement of the pilot valve will obviously be inversely proportional to the initial tension at which the springs are set. A vent opening above piston 202 is designated 209 in Fig. 4.

In the proportioning surge chamber of Fig. 4, the movement of piston 202 in opposite directions is limited only by total compression of either of the springs 203 and 204. In this form adjustment may be made with only one operation, manipulation of screw 207, but in the form shown in Fig. 3, while two adjustments must be made, namely, screw 196 and plug 191, it is possible to provide different limits of movement at opposite sides of piston 193, thereby providing for selectively quicker governor action in either direction as compared with the other, if desired.

What is claimed is:

A hydraulic governor comprising a pressure chamber and a regulator movable therein in response to differential pressure, fluid passage means communicating with the pressure chamber, a rotary member and a bearing support therefor, a pilot valve movable axially in said rotary member in response to changes in speed in the rotary member, an opening in said rotary member and means on said pilot valve normally blocking said opening, speed responsive means actuable by said rotary member for controlling axial movements of said pilot valve, said fluid passage means leading to said rotary member in axial registry with said opening whereby upon displacement of the pilot valve to expose said opening fluid pressure is transmitted to the pressure chamber, a fluid pressure chamber in said rotary member and a piston fixed to for movement directly with said pilot valve and operable to compress and expand said chamber upon displacement of the pilot valve in opposite directions, an adjustable outlet orifice leading from the second mentioned fluid chamber to a fluid reservoir, and resilient push-pull means connected to said piston to directly urge the same toward neutral position when the pilot valve has been moved to a pressure connecting position.

ARMIN H. RODECK.
ALBERT G. MASSEY.

REFERENCES CITED

The following references are of record in the file of this patent:

UNITED STATES PATENTS

| Number | Name | Date |
| --- | --- | --- |
| 1,106,434 | Woodward | Aug. 11, 1914 |
| 2,219,229 | Kalin | Oct. 22, 1940 |
| 2,333,184 | Kalin | Nov. 2, 1943 |
| 2,364,115 | Whitehead | Dec. 5, 1944 |
| 2,463,495 | Rodeck | Mar. 1, 1949 |
| 2,478,183 | Drake | Aug. 9, 1949 |